(12) United States Patent
Lei (10) Patent No.: US 11,891,856 B1
(45) Date of Patent: Feb. 6, 2024

(54) ROLLER SHUTTER WITH DUAL OPERATION MODES

(71) Applicant: Dongguan City GeShengMei Industrial Co., Ltd, Guangdong (CN)

(72) Inventor: Taotao Lei, Guangdong (CN)

(73) Assignee: Dongguan City GeShengMei Industrial Co., Ltd, Dongguan (CN)

( * ) Notice: Subject to any disclaimer, the term of this patent is extended or adjusted under 35 U.S.C. 154(b) by 0 days.

(21) Appl. No.: 18/202,950

(22) Filed: May 28, 2023

(30) Foreign Application Priority Data

Apr. 28, 2023 (CN) .......................... 202310482576.5

(51) Int. Cl.
  *E06B 9/74* (2006.01)
  *E06B 9/171* (2006.01)
  *E06B 9/58* (2006.01)
  *F16D 11/14* (2006.01)
  *E06B 9/72* (2006.01)
  *E06B 9/68* (2006.01)

(52) U.S. Cl.
  CPC ................ *E06B 9/74* (2013.01); *E06B 9/171* (2013.01); *E06B 9/58* (2013.01); *E06B 9/72* (2013.01); *F16D 11/14* (2013.01); *E06B 2009/6827* (2013.01); *E06B 2009/6836* (2013.01); *E06B 2009/6863* (2013.01)

(58) Field of Classification Search
  CPC ... F16D 11/14; E06B 9/72; E06B 9/70; E06B 9/74; E06B 9/68; E06B 9/56; E06B 9/58; E06B 9/60; E06B 9/62; E06B 9/08; E06B 9/11; E06B 9/13; E06B 9/15; E06B 9/17; E06B 9/171; E06B 2009/587; E06B 2009/6809; E06B 2009/6818; E06B 2009/6827; E06B 2009/6863; E06B 2009/6836
  See application file for complete search history.

(56) References Cited

U.S. PATENT DOCUMENTS

| 1,830,405 | A | * | 11/1931 | Ohno | ........................ E06B 9/74 49/140 |
| 3,285,089 | A | * | 11/1966 | Tsugawa | .................... E06B 9/74 160/310 |
| 3,637,004 | A | * | 1/1972 | Wardlaw | ................... E06B 9/84 160/133 |
| 3,640,332 | A | * | 2/1972 | Luby | ....................... E06B 9/171 160/133 |

(Continued)

*Primary Examiner* — Johnnie A. Shablack (57) ABSTRACT

A roller shutter with dual operation modes includes a door frame, a roller shutter body, a driving motor, a connecting device, a rotating shaft and a connecting rod. The roller shutter body is slidably configured on the door frame, the rotating shaft is rotatably configured on the door frame, and the rotating shaft is connected with the driving motor through the connecting device. When the connecting device is in a connected state, the driving motor drives the connecting rod to retract or extend the roller shutter body; when the connecting device is a separated state, the rotating shaft is manually operated to drive the connecting rod to retract or extend the roller shutter body. The roller shutter can be opened or closed by manual operation in the absence of power supply or in case of circuit failure, which greatly improves the reliability and convenience.

19 Claims, 10 Drawing Sheets

(56) References Cited

U.S. PATENT DOCUMENTS

| | | | | |
|---|---|---|---|---|
| 4,079,597 | A * | 3/1978 | Lindner | E06B 9/72 310/67 R |
| 4,147,197 | A * | 4/1979 | Bailey | E06B 9/82 160/8 |
| 4,519,434 | A * | 5/1985 | Forquer | E06B 9/171 160/133 |
| 4,651,940 | A * | 3/1987 | Nakamura | E06B 9/88 160/310 |
| 4,931,708 | A * | 6/1990 | Johnsen | E06B 9/72 160/133 |
| 4,974,658 | A * | 12/1990 | Komatsu | E06B 9/72 160/264 |
| 5,070,925 | A * | 12/1991 | Paule | E06B 9/17061 160/133 |
| 5,198,974 | A * | 3/1993 | Orsat | E06B 9/70 160/310 |
| 5,336,136 | A * | 8/1994 | Jacqui | F16H 1/46 475/275 |
| 5,447,477 | A * | 9/1995 | Bresson | E06B 9/74 160/310 |
| 5,711,360 | A * | 1/1998 | Viotte | E06B 9/74 160/310 |
| 5,803,150 | A * | 9/1998 | Boiteau | E04F 10/0648 160/310 |
| 5,883,480 | A * | 3/1999 | Domel | E06B 9/68 318/16 |
| 5,975,185 | A * | 11/1999 | Miller | E06B 9/74 160/310 |
| 6,055,885 | A * | 5/2000 | Shea | E06B 9/74 49/140 |
| 6,082,433 | A * | 7/2000 | Vafaie | E06B 9/68 160/310 |
| 6,085,825 | A * | 7/2000 | Swink | E05F 15/67 160/133 |
| 6,155,324 | A * | 12/2000 | Elliott | E06B 9/68 160/133 |
| 6,381,903 | B1 * | 5/2002 | Desrochers | E06B 9/74 160/310 |
| 6,628,029 | B2 * | 9/2003 | Astegno | E06B 9/72 160/310 |
| 6,700,246 | B1 * | 3/2004 | Bruhn | F16D 51/02 192/81 C |
| 6,883,577 | B2 * | 4/2005 | Frede | E06B 9/56 160/133 |
| 6,979,962 | B2 * | 12/2005 | Cavarec | E06B 9/32 318/9 |
| 7,798,198 | B2 * | 9/2010 | Rejc | E06B 9/62 160/133 |
| 7,886,805 | B2 * | 2/2011 | Svenson | E06B 9/60 160/315 |
| 7,913,739 | B2 * | 3/2011 | Rejc | E06B 9/08 160/133 |
| 8,011,414 | B2 * | 9/2011 | Levy | E06B 9/82 160/133 |
| 8,272,425 | B2 * | 9/2012 | Coenraets | E06B 9/58 160/133 |
| 8,464,776 | B2 * | 6/2013 | Anthoine | F16D 3/68 160/310 |
| 8,708,877 | B2 * | 4/2014 | Kirihara | E06B 9/72 492/15 |
| 8,723,454 | B2 * | 5/2014 | Skinner | E06B 9/72 318/16 |
| 8,746,321 | B2 * | 6/2014 | Miller | E06B 9/15 160/310 |
| 8,857,497 | B1 * | 10/2014 | Konrad | E06B 9/15 160/183 |
| 8,919,419 | B2 * | 12/2014 | Mullet | E06B 9/62 160/310 |
| 9,162,094 | B2 * | 10/2015 | Hsieh | A62C 2/247 |
| 9,890,587 | B2 * | 2/2018 | Adams | E06B 9/72 |
| 10,012,015 | B2 * | 7/2018 | Rejc | E05D 13/1246 |
| 10,017,987 | B2 * | 7/2018 | Carvalheiro | E06B 9/68 |
| 10,107,033 | B2 * | 10/2018 | Mugnier | E06B 9/82 |
| 10,174,553 | B2 * | 1/2019 | Mugnier | E06B 9/15 |
| 10,294,708 | B2 * | 5/2019 | Quaiser | E05F 15/668 |
| 10,344,532 | B2 * | 7/2019 | Mazzoni | E06B 9/72 |
| 10,450,797 | B2 * | 10/2019 | Li | E06B 9/82 |
| 10,648,231 | B2 * | 5/2020 | Dann | F16D 23/12 |
| 10,669,775 | B2 * | 6/2020 | Cole | E06B 9/90 |
| 10,829,989 | B2 * | 11/2020 | Rejc | E05D 15/242 |
| 10,858,885 | B2 * | 12/2020 | Walter-Seifart | E05F 15/00 |
| 10,879,780 | B2 * | 12/2020 | Tollance | H02K 1/146 |
| 10,938,268 | B2 * | 3/2021 | Meynet | E06B 9/42 |
| 11,111,723 | B2 * | 9/2021 | Hsieh | A62C 2/18 |
| 11,137,034 | B2 * | 10/2021 | Dang | F16D 23/12 |
| 11,142,946 | B2 * | 10/2021 | McNabb | E06B 9/582 |
| 11,162,301 | B2 * | 11/2021 | Ouyang | E06B 9/17007 |
| 11,230,883 | B2 * | 1/2022 | Sonzini | E06B 9/72 |
| 11,236,545 | B2 * | 2/2022 | Sonzini | E06B 9/72 |
| 11,280,132 | B2 * | 3/2022 | Sonzini | E06B 9/50 |
| 11,306,531 | B2 * | 4/2022 | Sonzini | H02K 11/33 |
| 11,332,976 | B2 * | 5/2022 | Eichstetter | E06B 9/13 |
| 11,459,823 | B2 * | 10/2022 | Xia | E06B 9/74 |
| 11,486,197 | B2 * | 11/2022 | Kasai | H02K 7/102 |
| 11,499,369 | B2 * | 11/2022 | Rejc | E06B 9/13 |
| 11,613,926 | B2 * | 3/2023 | Dahlgren | E06B 9/62 160/310 |
| 2005/0035238 | A1 * | 2/2005 | Fun | E06B 9/80 242/381 |
| 2009/0266931 | A1 * | 10/2009 | Gottschalk | E06B 9/17 72/367.1 |
| 2017/0328126 | A1 * | 11/2017 | Bonge, Jr. | E06B 9/171 |
| 2018/0259033 | A1 * | 9/2018 | Basutto | E06B 9/72 |
| 2019/0234131 | A1 * | 8/2019 | Seadia | E05F 15/71 |
| 2019/0360266 | A1 * | 11/2019 | Rejc | E05F 15/668 |
| 2020/0011131 | A1 * | 1/2020 | Bonge, Jr. | E06B 7/32 |
| 2021/0131178 | A1 * | 5/2021 | Fischer | E06B 9/58 |
| 2023/0090663 | A1 * | 3/2023 | Frede | E06B 9/58 |
| 2023/0123246 | A1 * | 4/2023 | Darlot | H02P 23/0031 160/10 |
| 2023/0167680 | A1 * | 6/2023 | Hawkins | E06B 9/72 160/309 |

\* cited by examiner

ROLLER SHUTTER WITH DUAL OPERATION MODES

CROSS REFERENCE TO RELATED APPLICATIONS

The present application claims the benefit of Chinese Patent Application No. 202310482576.5, filed on Apr. 28, 2023, the contents of which are incorporated herein by reference in their entirety.

FIELD OF THE INVENTION

The present application relates to the technical field of automatic doors, in particular to a roller shutter with dual operation modes.

BACKGROUND OF THE INVENTION

Animals are friends of human beings. People usually keep some pet animals indoors such as in barns, pens or special cages. However, it's necessary to frequently or regularly keep them outdoors for their health. In the absence of the animal owner, a safety apparatus that can automatically perform these operations instead of the owner is necessary.

Currently, an automatic door is used as a typical safety apparatus for automatically performing theses operations. However, the reliability of the automatic door relying on electricity is required to be improved for the higher safety consideration. For example, in the absence of supply power or in case of circuit failure, the motor cannot drive the automatic door to open or close, at the same time, the output end of the motor may lock or stuck the automatic door, leading to the failure of the manual operation for opening the door, so that the animals may be trapped indoors or lost outdoors.

SUMMARY OF THE INVENTION

The present invention aims to provide a roller shutter with an automatic operation mode and a manual operation mode, the roller shutter can be opened or closed by manual operation in the absence of power supply or in case of circuit failure, which greatly improves the reliability and convenience of the roller shutter.

To achieve the above purpose, a roller shutter with dual operation modes of the present invention includes a door frame, a roller shutter body, a driving motor, a connecting device, a rotating shaft and a connecting rod, wherein the roller shutter body is slidably configured on the door frame, and the driving motor is configured on the door frame; the rotating shaft is rotatably configured at an upper end of the door frame, one end of the connecting rod is configured on the rotating shaft, and another end of the connecting rod is connected with an upper end of the roller shutter body; the rotating shaft is connected with an output end of the driving motor through the connecting device; when the connecting device is in a connected state, the driving motor is configured to drive the connecting rod to retract or extend the roller shutter body; when the connecting device is a separated state, the rotating shaft is manually operated to drive the connecting rod to retract or extend the roller shutter body.

In comparison with the prior art, in the present invention, the roller shutter body is slidably configured on the door frame, the driving motor and the rotating shaft are arranged on the door frame, and the output end of the driving motor is connected with the rotating shaft by the connecting device, and the rotating shaft is connected with the upper end of the roller shutter body 2 through the connecting rod. In such configurations, by connecting the connecting device, the output end of the driving motor can be fixedly connected with the rotating shaft circumferentially, so that the connecting rod can be circumferentially rotated around the central axis of the rotating shaft, to drive the roller shutter body to automatically retract or extend, thereby automatically opening or closing the roller shutter. Furthermore, by disconnecting the connecting device, the output end of the driving motor can be separated from the rotating shaft, to avoid the rotating shaft to be stuck or locked by the stopped driving motor, so that the rotating shaft may be manually driven to rotate the connecting rod, and the roller shutter body is accordingly driven to retract or extend, thereby manually opening or closing the roller shutter. By these tokens, the roller shutter of the present invention may be automatically opened or closed during a normal power supply, and also may be opened or closed by manual operation in the absence of power supply or in case of circuit failure, which greatly improves the reliability and convenience of the roller shutter.

Preferably, the connecting device includes a first connector and a second connector, the first connector is connected with the output end of the driving motor, the second connector is connected with the rotating shaft; the rotating shaft is movably configured on the door frame along a center axis direction, the first connector is engaged with the second connector, so that the first connector and the second connector are mutually fixed circumferentially and movable axially. In such a way, the connecting device may be connected or disconnected by the engagement or disengagement of the both connectors, thereby switching the automatic operation and the manual operation.

Specifically, the connecting device further includes an elastic element configured to provide an elastic force to facilitate a mutual connection between the first connector and the second connector. In such a way, the second connector may be automatically engaged with the first connector, which ensures that the driving motor automatically drives the rotating shaft to rotate, improves the reliability of the driving and the safety of use.

Specifically, one of the first connector and the second connector is provided with a plurality of engagement portions extended around a central axis thereof, and another of the first connector and the second connector is provided with a plurality of receiving portions to receive the engagement portions. In such a way, the first connector and the second connector may be connected together to transfer torque, or disconnected and separated from one another to prevent any interference, which is helpful to realize the switch between the automatic operation and the manual operation.

Specifically, a center of the first connector is provided with a sliding shaft, and a center of the second connector is provided with a hole to allow the sliding shaft to slide therein. In such a way, the sliding between the first connector and the second connector is stable.

Specifically, one end of the second connector far from the rotating shaft is provided with a limiting part, to avoid an excessive movement of the rotating shaft.

Preferably, the connecting rod is slidably connected with the upper end of the roller shutter body, and has a sliding direction same with an axial direction of the connecting device. In the manual operation, it is necessary to drive the rotating shaft to leave the output end of the driving motor, and the rotating shaft drives the connecting rod to move synchronously, therefore, the connecting rod connected with the roller shutter body may move synchronously to avoid the interference.

Preferably, the connecting rod is slidably connected with the rotating shaft, and has a sliding central shaft perpendicular to a central shaft of the rotating shaft. When the connecting rod drives the roller shutter body to retract, the upper end of the roller shutter body will be closer and closer to the rotating shaft along the spiral line of the receiving rails, the distance between the roller shutter body and the rotating shaft will be gradually reduced, therefore, interference among the connecting rod, the rotating shaft and the roller shutter body will not be generated as the connecting rod is slidable on the rotating shaft, which ensures the stable and reliable retraction.

Preferably, the connecting rod is extendable.

Preferably, one end of the rotating shaft far from the connecting device is provided with a hand wheel. In such a way, the manual operation is convenient.

Preferably, both sides of the door frame are provided with a luminous element arranged along a height direction of the door frame. In such a way, a luminous indicator is formed to attract or help animals for finding the target door.

Specifically, the door frame is provided with a receiving groove with an opening formed at a front side thereof, and the luminous element is configured in the receiving groove and exposed at the opening. In such a way, the luminous element may be firmly and stably installed on the door frame, and also may be protected.

Preferably, the roller shutter further includes a controller and a sensor, wherein the controller is electrically connected with the sensor and the driving motor respectively, the sensor is configured on a front side of the door frame and is configured to instruct the controller to stop the driving motor when an object appears below the roller shutter body. In such a way, the safety is improved to protect the animals.

Preferably, the roller shutter further includes a controller which is configured as a light sensor to detect light in environment.

Specifically, the controller is configured to instruct the driving motor according to a signal from the light sensor, and the driving motor is energized to drive the roller shutter body; when the roller shutter body moves in place and in a limiting position, an increase of a supply current of the driving motor is detected, and the controller instructs the driving motor to disconnect the supply current.

Preferably, the roller shutter further includes a controller which is configured as one of a temperature and humidity sensor, a rain sensor, an infrared sensor, a microwave sensor, a wind speed sensor, a voice control sensor and a programmable timer to control the driving motor to drive the roller shutter body.

Preferably, the roller shutter further includes an accumulator and a solar panel electrically connected with the accumulator, wherein the accumulator is configured in a box body of the controller and electrically connected with the controller and the accumulator.

Preferably, the door frame is provided with a first groove and a second groove at both sides to allow two sides of the roller shutter body to slide thereon; and a housing is further arranged on the door frame and provided with two receiving rails at both sides, and ends of the receiving rails are connected with ends of the first groove and the second groove.

Specifically, each of the receiving rails is in a planar spiral structure.

Preferably, the door frame includes two side frames, and the side frames and the housing are provided with fixed holes.

Preferably, a lower edge of the roller shutter body is provided with a limiting rod.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

In order to make the purpose, technical solutions and advantages of the present application more clearly understood, the present application will be described in further detail below with reference to the accompanying drawings and embodiments.

Figure 1:
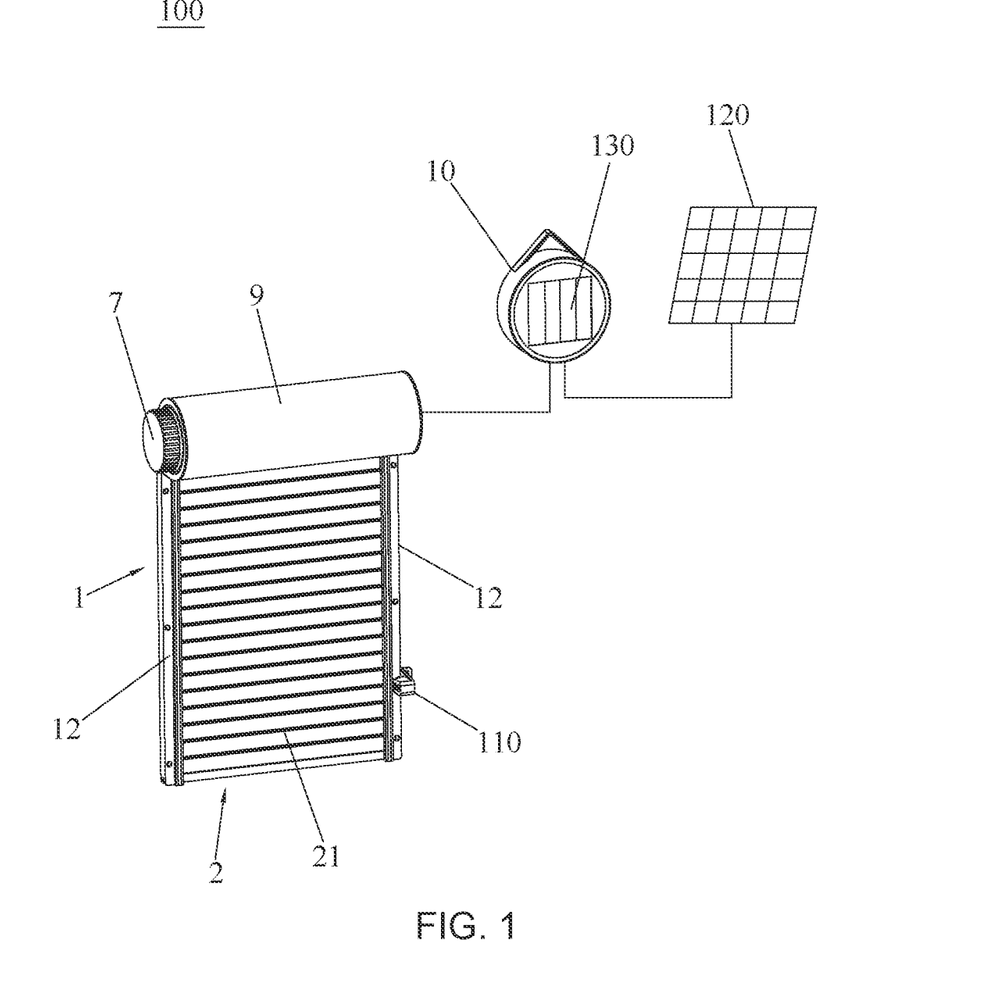
FIG. 1 is a perspective view of a roller shutter with dual operation modes according to an embodiment of the invention.
Figure 2:
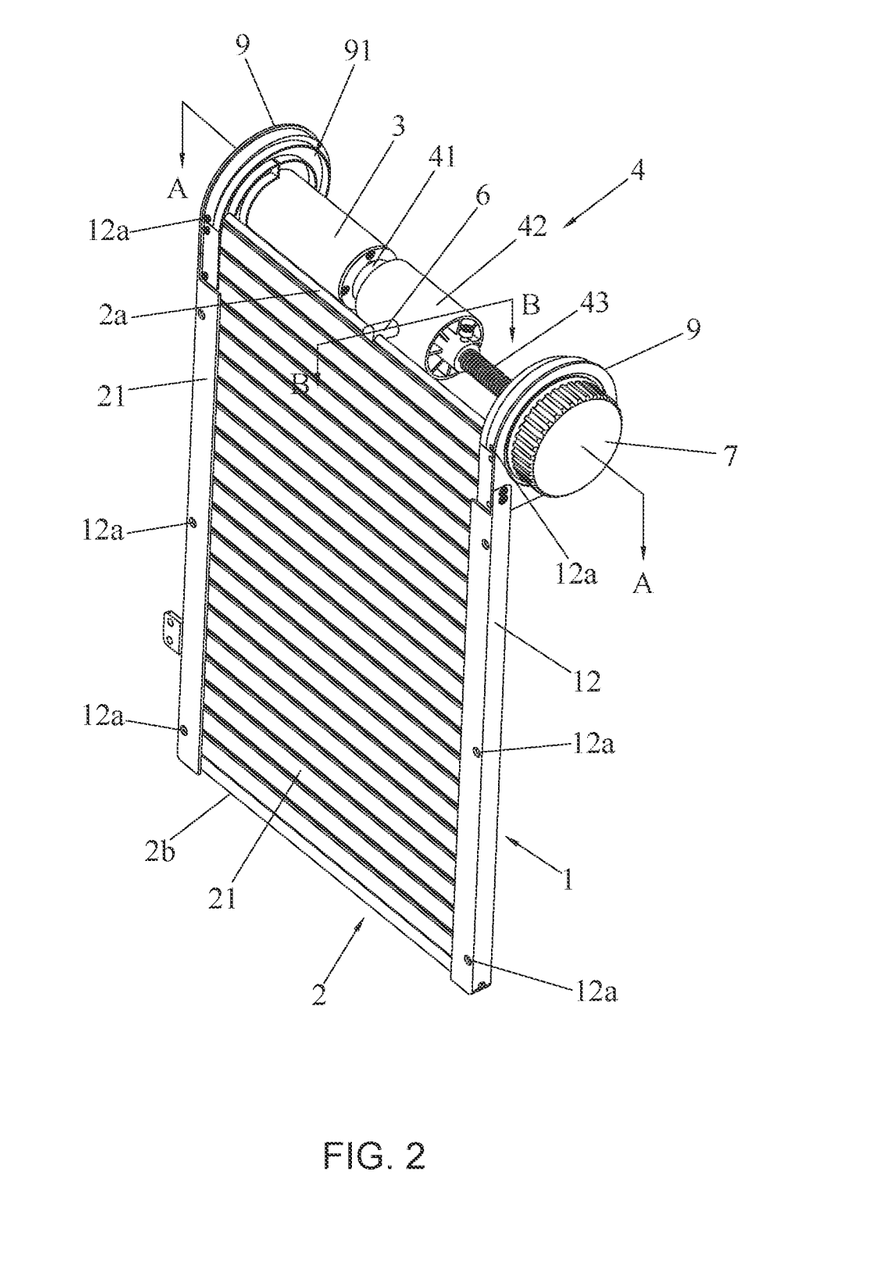
FIG. 2 is a structure diagram of a roller shutter with dual operation modes according to an embodiment of the invention.
Figure 3:
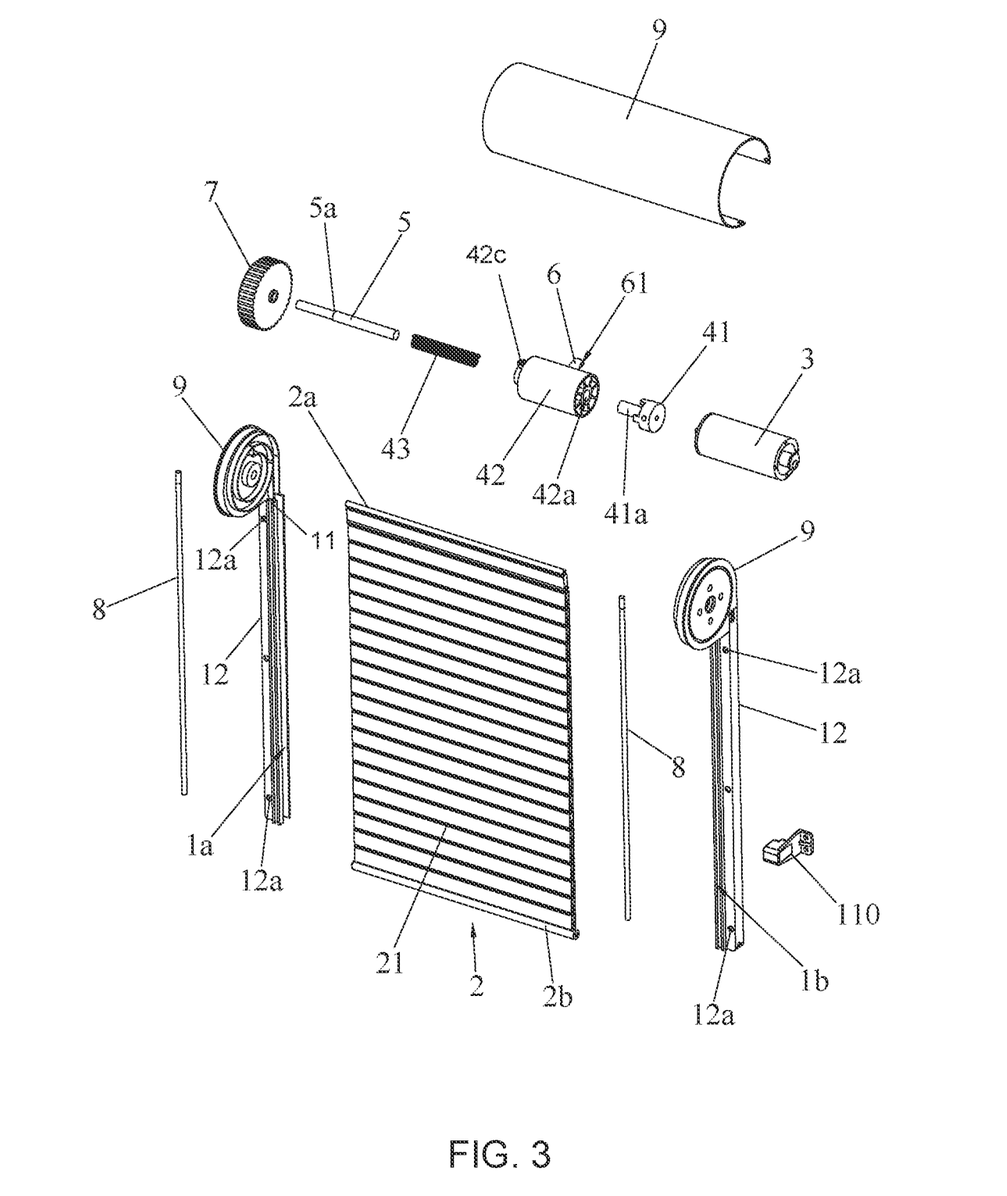
FIG. 3 is an exploded view of a roller shutter with dual operation modes according to an embodiment of the invention.

Referring to FIGS. 1-3, a roller shutter with dual operation modes 100 according to the present invention includes a door frame 1, a roller shutter body 2, a driving motor 3, a connecting device 4, a rotating shaft 5 and a connecting rod 6. Specifically, the roller shutter body roller curtain 2 is configured on the door frame 1 and slidable along the door frame 1 up and down, and includes a plurality of slat members 21 mutually hinged. The driving motor 3 is configured on the door frame 1. The rotating shaft 5 is configured at an upper end of the door frame 1 and is rotatable about the central axis thereof, and the central axis of the rotating shaft 5 is the same with the horizontal direction of the door frame 1. One end of the connecting rod 6 is configured on the rotating shaft 5, and the other end of the connecting rod 6 is connected with an upper end of the roller shutter body 2. The rotating shaft 5 is coaxially connected with an output end of the driving motor 3 through the connecting device 4. When the connecting device 4 is in connected state, the driving motor 3 is configured to drive the connecting rod 6 to retract or extend the roller shutter body 2 through the connecting device 4 and the rotating shaft 5; when the connecting device is in separated state, the rotating shaft 5 is manually operated to drive the connecting rod 6 to retract or extend the roller shutter body 2.

Figure 8:
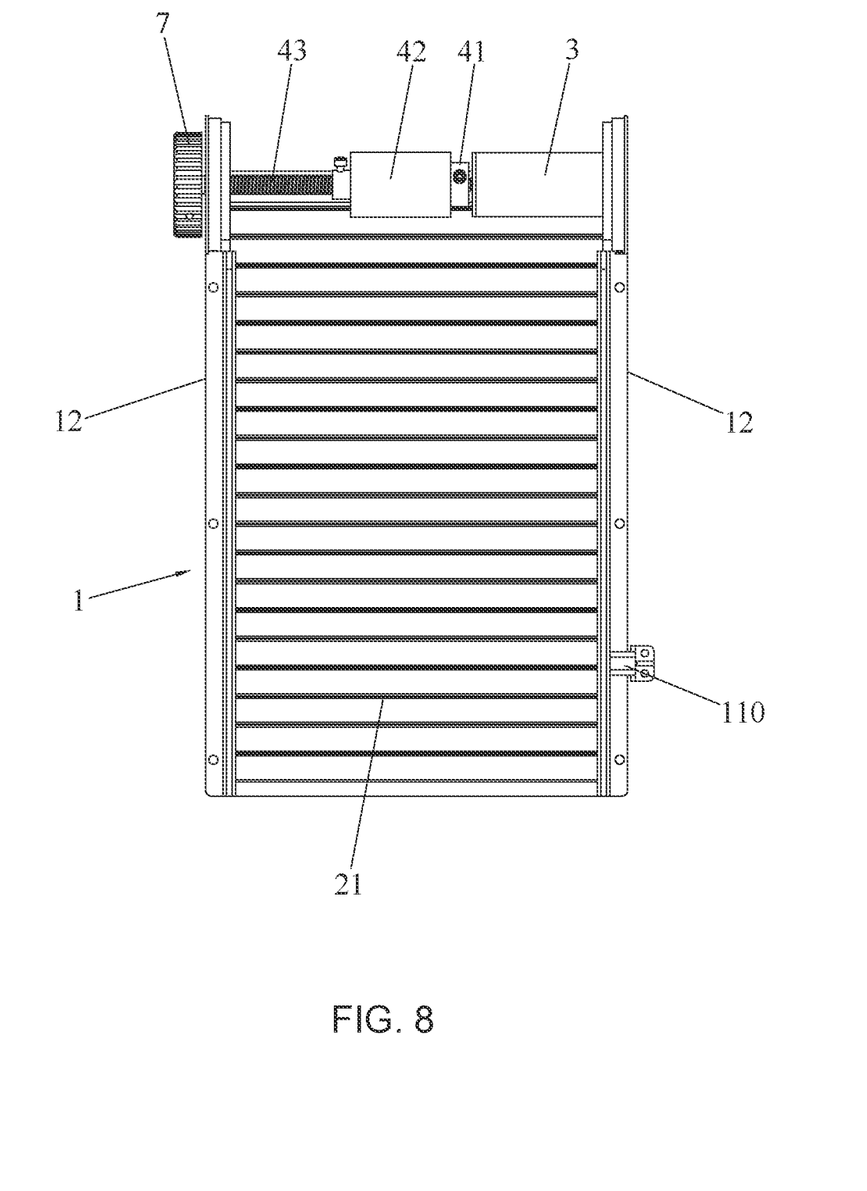
FIG. 8 is a view showing the roller shutter under the automatic operation mode according to an embodiment of the invention.
Figure 9:
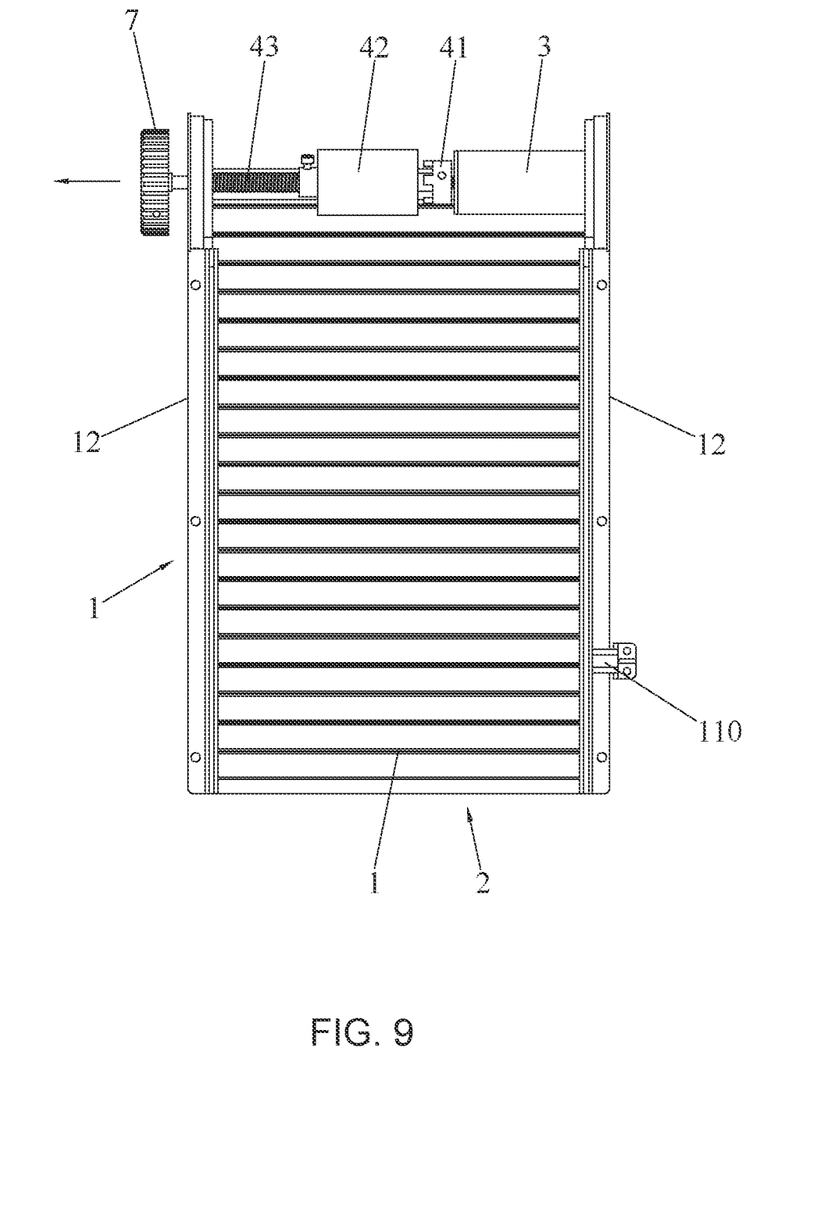
FIG. 9 is a view showing the roller shutter under the manual operation mode according to an embodiment of the invention.

Referring to FIGS. 2-5, the connecting device 4 includes a first connector 41, a second connector 42 and an elastic element 43. One end of the first connector 41 is configured on the output end of the driving motor 3, and specifically is fixedly connected with the output end of the driving motor 3 by a screw 31. One end of the second connector 42 is configured on one end of the rotating shaft 5, and specifically is fixedly connected with the rotating shaft 5 by a screw 42c. The rotating shaft 5 is configured on the door frame 1 and is slidable along the central axis direction thereof. One end of the rotating shaft 5 far from the second connector 42 is provided with a limiting part 5a, and the limiting part 5a may be pressed against the housing 9 of the shutter door when the rotating shaft 5 is moved to the maximum extent, so as to prevent an excessive movement of the rotating shaft 5. A center of the first connector 41 is provided with a sliding shaft 41a, and a center of the second connector 42 is provided with a hole 42a to allow the sliding shaft 41a to slide therein. Specifically, the first connector 41 is engaged with the second connector 42, so that the both are mutually fixed circumferentially and movable axially. In such a way, the connecting device 4 may be connected or disconnected by the engagement or disengagement of the both connectors, thereby switching the automatic operation and the manual operation, as shown in FIG. 8 and FIG. 9. Specifically, the elastic element 43 is set around the rotating shaft 5, and is arranged between the door frame 1 and the second connector 42, by which an elastic force is provided to drive the rotating shaft 5 to slide, and then the second connector 42 may be engaged with the first connector 41. In such a way, the second connector 42 may be automatically engaged with the first connector 41, which ensures that the driving motor 3 automatically drives the rotating shaft 5 to rotate, improves the reliability of the driving and the safety of use. Optionally, the elastic element 43 is a compression spring.

Figure 4:
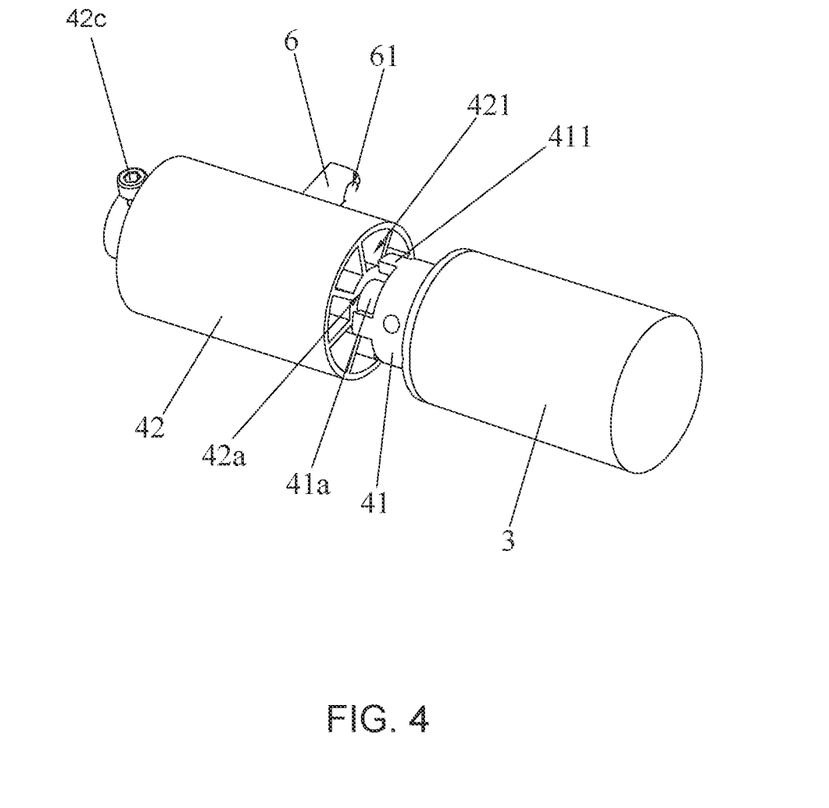
FIG. 4 is a structure diagram of a connecting device of the roller shutter with dual operation modes according to an embodiment of the invention.

Referring to FIG. 4, specifically, one of the first connector 41 and the second connector 42 is provided with a plurality of engagement portions 411 extended around a central axis thereof, and the other of the first connector 41 and the second connector 42 is provided with a plurality of receiving portions 421 to receive the engagement portions 411. In the present embodiment, the engagement portions 411 are provided on the first connector 41, and the receiving portions 421 are provided at one end of the second connector 42. The engagement portions 411 are sized and shaped to insert in the receiving portions 421. Due to such an engagement between the engagement portions 411 and the receiving portions 421, the first connector 41 and the second connector 42 may be fixed in the circumferential direction, and may be movable in the axial direction. In such a way, the first connector 41 and the second connector 42 may be connected together to transfer torque, or disconnected and separated from one another to prevent any interference, which is helpful to realize the switch between the automatic operation and the manual operation, as shown in FIG. 8 and FIG. 9.

Referring to FIGS. 2 and 3, the connecting rod 6 is slidably connected with the upper end of the roller shutter body 2, and the sliding direction of the connecting rod 6 is the same with the axial direction of the connecting device 4. Specifically, the end of the connecting rod 6 is provided with a round hole 61, and the upper end of the roller shutter body 2 is provided with an upper shaft 2a on both sides, and the upper shaft 2a is slidably inserted through the round hole 61. In the manual operation, it is necessary to drive the rotating shaft 5 to leave the output end of the driving motor 3, and the rotating shaft 5 drives the connecting rod 6 to move synchronously, therefore, the connecting rod 6 connected with the roller shutter body 2 may move synchronously to avoid the interference.

Figure 5:
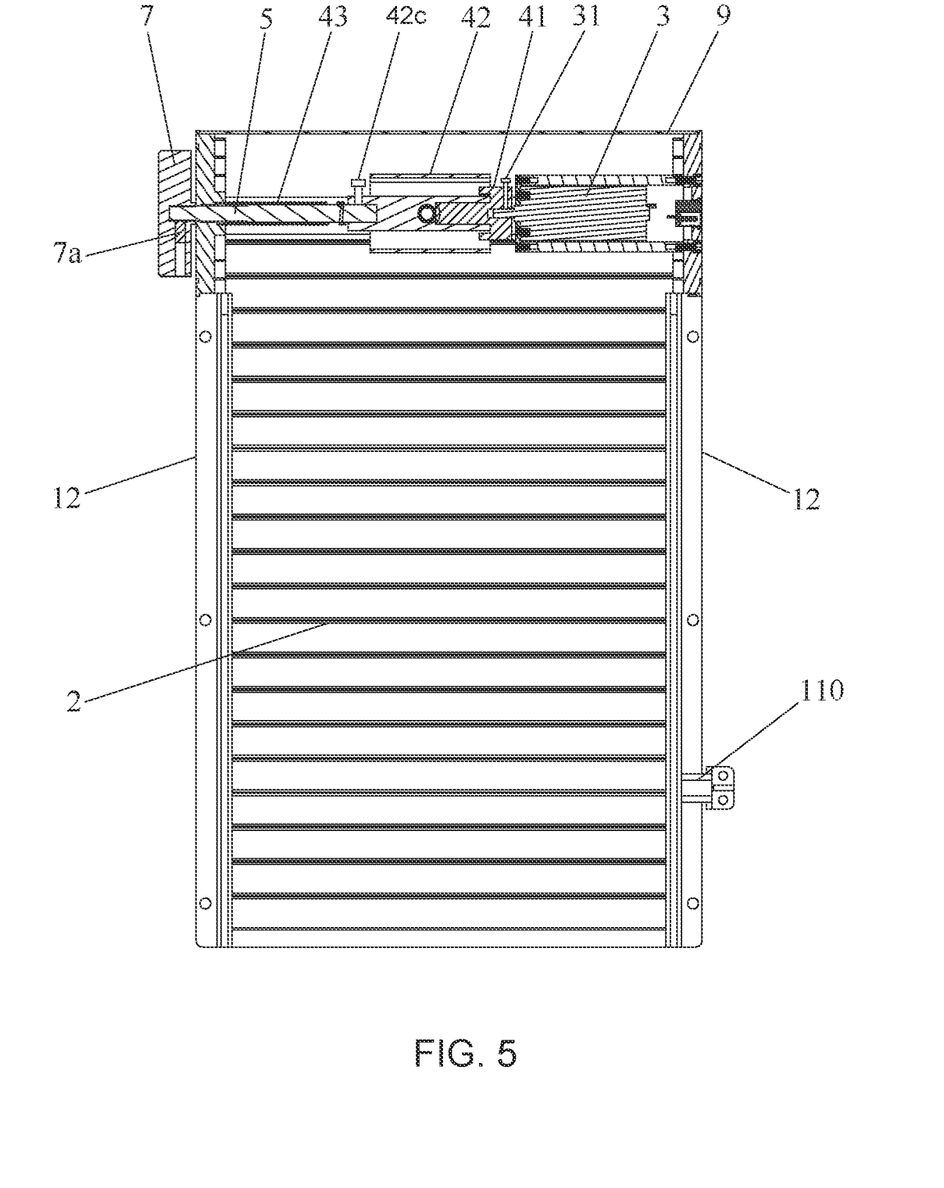
FIG. 5 is a cross section view along A-A direction in FIG. 2.

Referring to FIGS. 2 and 5, one end of the rotating shaft 5 far from the connecting device 4 is provided with a hand wheel 7. The hand wheel 7 is located on the outer side of the housing 9 of the roller shutter, and sleeved on the rotating shaft 5 by a screw 7a to achieve a fixed connection. The presence of the hand wheel 7 is convenient to manually drive the rotating shaft 5, thereby facilitating the operation.

Referring to FIGS. 3 and 5, both sides of the door frame 1 are provided with a luminous element 8 arranged along a height direction of the door frame 1, which is served as a luminous indicator to attract or help animals for finding the target door. Specifically, the door frame 1 is provided with a receiving groove 11 with an opening formed at the front side, and the luminous element is configured in the receiving groove and exposed at the opening. In such a way, the luminous element 8 may be firmly and stably installed on the door frame 1, and also may be protected. Preferably, the luminous element 8 is in a strip, and several LEDs are arranged in the luminous element 8. The receiving groove 11 has a circular cross section, and the luminous element 8 is embedded in the receiving groove 11 and electrically connected with the controller 10.

Figure 7:
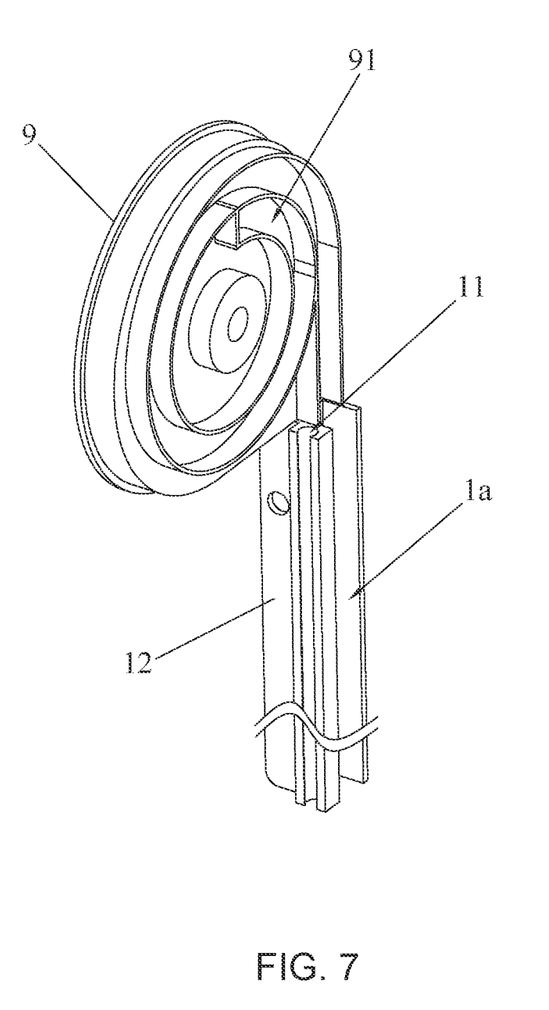
FIG. 7 is a structure diagram of a door frame and a housing of the roller shutter with dual operation modes according to an embodiment of the invention.

Referring to FIGS. 3 and 7, the door frame 1 is provided with a first groove 1a and a second groove 1b at both sides to allow two sides of the roller shutter body 2 to slide thereon. A housing 9 is further arranged on the door frame 1 and includes two side walls each of which is provided with a receiving rail 91. Ends of the receiving rails 91 are connected with an end of the first groove 1a and an end of the second groove 1b respectively. The side edges of the roller shutter body 2 may slide into or out of the receiving rails 91 along the first groove 1a and the second groove 1b respectively to adjust the height of the channel below the roller shutter body 2. Specifically, each of the receiving rails 91 is in a planar spiral structure. The length of the receiving rail 91 is greater than or equal to the length of the roller shutter body 2. The rotating shaft 5 is coaxially located at the center of the planar spiral line of the receiving rail 91. As shown in FIGS. 2 and 3, the door frame 1 includes two side frames 12, and the side frames 12 and the housing 9 are provided with fixed holes 12a. Specifically, one fixing hole 12a is provided on the housing 9, and at least two fixing holes 12a are provided on the side frames 12, and the housing 9 and the side frames 12 may be fixed by using screws.

Figure 6:
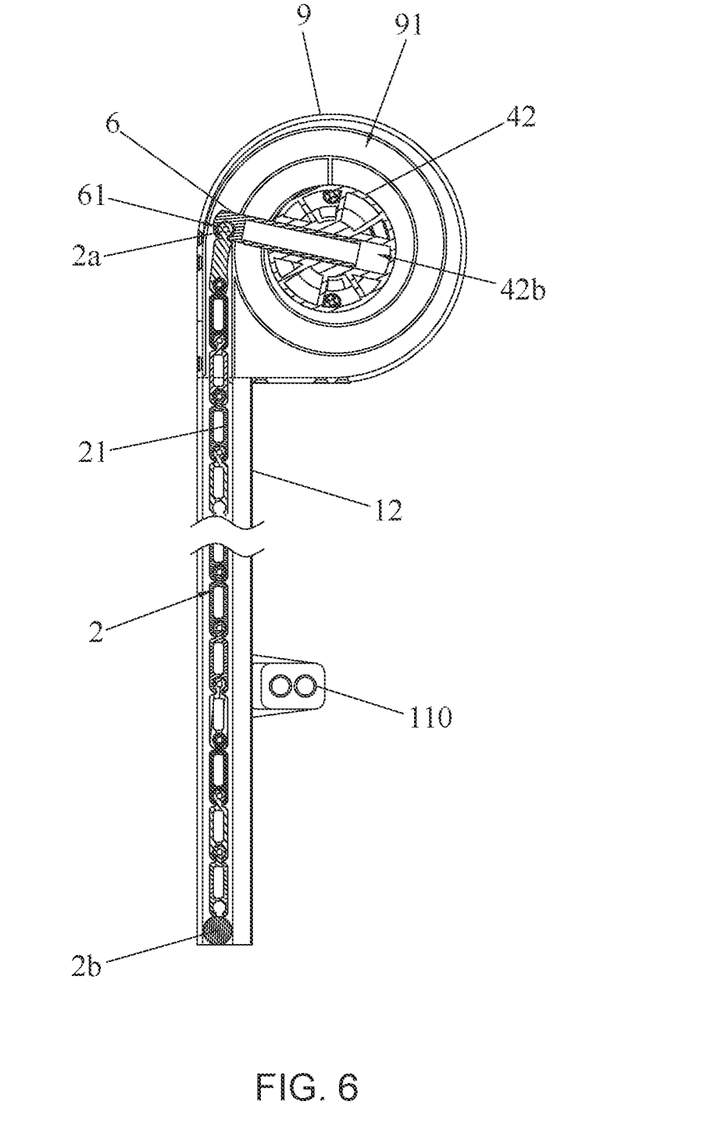
FIG. 6 is a cross section view along B-B direction in FIG. 2.

Referring to FIGS. 2, 3 and 6, the connecting rod 6 is slidably connected with the rotating shaft 5, and has a sliding central shaft perpendicular to a central shaft of the rotating shaft 5. Optionally, the connecting rod 6 may be extendable. When the connecting rod 6 drives the roller shutter body 2 to retract, the upper end of the roller shutter body 2 will be closer and closer to the rotating shaft 5 along the spiral line of the receiving rails 91, the distance between the roller shutter body 2 and the rotating shaft 5 will be gradually reduced, therefore, interference among the connecting rod 6, the rotating shaft 5 and the roller shutter body 2 will not be generated as the connecting rod 6 is slidable on the rotating shaft 5, which ensures the stable and reliable retraction. Specifically, the rotating shaft 5 is fixed to the second connector 42, thus the connector 6 is slidably arranged on the second connector 42 in this embodiment. More specifically, the second connector 42 is provided with a receiving hole 42b arranged in the radial direction, and one end of the connecting rod 6 is slidably inserted into the receiving hole 42b.

Referring to FIG. 1, the roller shutter with dual operation modes 100 further includes a controller 10 and a sensor 110 which are communicated with each other. The controller 10 is arranged next to the door frame 1. The sensor 110 is arranged on the door frame 1 and is located in the front of the door frame 1, and the sensor 110 is configured so as to send a signal to the controller 10 to stop the driving motor 3 once an object appears under the roller shutter body 2. Otherwise, driving motor 3 will be started again to drive the roller shutter body 2 to continue to move down. In such a way, the safety is improved as the door is sensitively controllable to protect the animals. Optionally, the sensor 110 may include an infrared transmitter and an infrared receiver.

The controller 10 can be configured to increase the resistance of the driving motor 3 when the roller shutter body 2 is completely opened or closed, and the power supply current of the driving motor 3 is detected by a CPU in the controller After a certain time, the CPU sends an instruction to disconnect the power supply of the driving motor 3.

Figure 10:
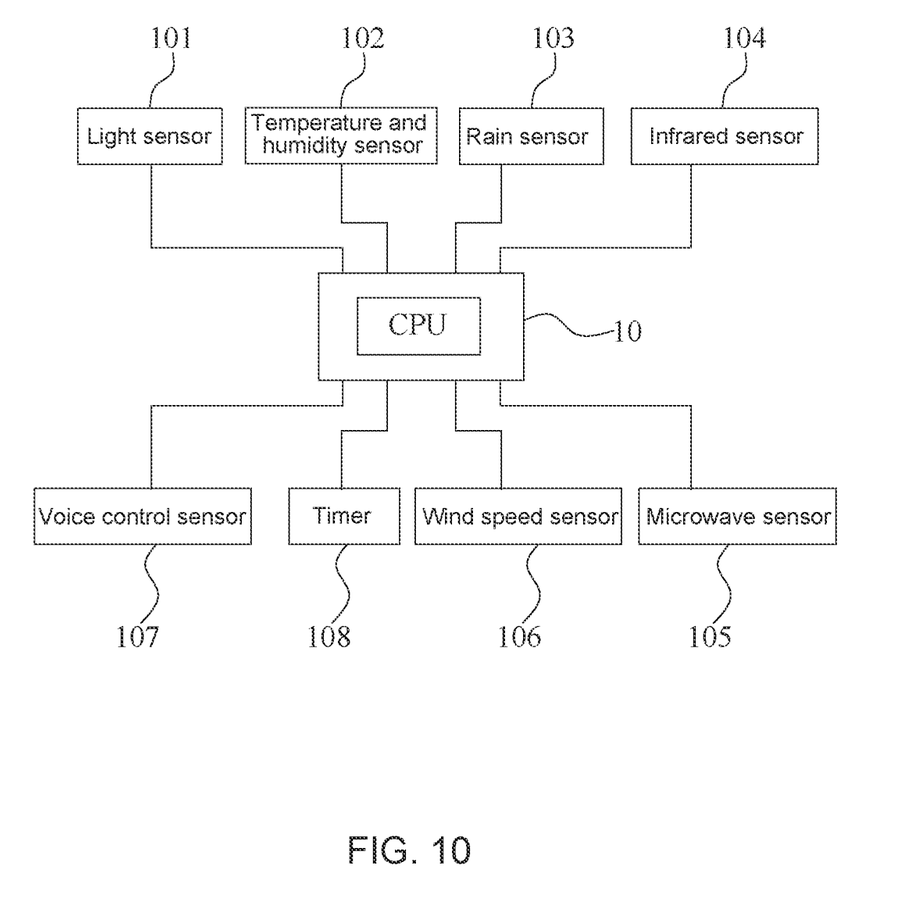
FIG. 10 is a schematic diagram showing the connection of the controller and each sensor of the roller shutter with dual operation modes according to an embodiment of the invention.

Referring to FIGS. 2, 3 and 10, a lower edge of the roller shutter body 2 is provided with a limiting rod 2b. The controller 10 is configured as a light sensor 101 to detect the light in environment. When the light sensor 101 detects a light signal in the morning, the CPU instructs the driving motor 3 to open the door, and then the driving motor 3 is energized to drive the roller shutter body to retract. When the roller shutter body 2 is retracted to the maximum extent, the roller shutter body 2 no long moves due to the limiting rod 2b, at this time, the resistance on the driving motor 3 is increased, thus the supply current of the driving motor 3 is increased, and then the CPU instruct the driving motor 3 to disconnect the supply current. When the light sensor 101 detects no light in the night, the CPU will send a closing instruction to the driving motor 3, and the driving motor 3 is energized to drive the roller shutter body 2 to extend. When the roller shutter body 2 is fully extended, the limiting rod 2b stands on the ground to limit a further movement of the roller shutter body 2, and the driving motor 3 is subjected to greater resistance. At this time, the supply current of the driving motor 3 is increased, and the CPU sends an instruction to disconnect the power supply of the driving motor 3. Optionally, the controller 10 may be configured with other sensors, such as a temperature and humidity sensor 102, a rain sensor 103, an infrared sensor 104, a microwave sensor 105, a wind speed sensor 106, a voice control sensor 107 and/or a programmable timer 108 to control the driving motor 3 to drive the roller shutter body 2 to move along the receiving rails 91. Optionally, the controller 10 may also be configured to control the driving motor 3 according to a remote wireless signal to drive the roller shutter body 2 to move along the receiving rails 91.

Referring to FIG. 1, the roller shutter 100 further includes an accumulator 130 and a solar panel 120 electrically connected with the accumulator 130. Specifically, the accumulator 130 is configured in a box body of the controller 10 or in the housing 9. The accumulator 130 is electrically connected with the controller 10 and the driving motor 3. The solar panel 120 is configured to convert light energy into electrical energy and transmit it to the accumulator 130, the accumulator 130 is configured to store the electrical energy from the solar panel 120 and supply power to the controller 10 and the drive motor 3. The accumulator 130 may store sufficient electric energy on sunny days so as to avoid the electric energy lack of the controller 10 on rainy or cloudy days.

When the roller shutter body 2 is automatically retracted and rolled up, the elastic element 43 is in a natural elastic state, the second connector 42 is engaged with the first connector 41, and the rotating shaft 5 is connected with the output shaft of the driving motor 3. At this time, the controller 10 starts the driving motor 3 according to a timing command, so that the rotating shaft 5 is driven to rotate through the driving motor 3 and the connecting device 4, and then the connecting rod 6 is rotated around the central axis of the rotating shaft 5, accordingly, the roller shutter body 2 is driven to move upward along the first groove 1a and the second groove 1b of the door frame 1 and rolled up and finally received in the receiving rail 91. When the roller shutter body 2 is retracted in place, the controller 10 controls and stops the driving motor 3. At this time, the roller shutter is in an open state. Similarly, when the roller shutter body 2 is automatically extended, it's just required to reverse the motion of the driving motor 3, causing the roller shutter body 2 to leave the receiving rail 91 and enter to the first groove 1a and the second groove 1b, and then the roller shutter is in a closed state, as shown in FIG. 8.

When the roller shutter body 2 is manually retracted and rolled up, the hand wheel 7 is held and pulled outward along the central axis direction of the rotating shaft 5, so that the rotating shaft 5 is driven to move axially as overcoming the elastic force of the elastic element 43, as a result, the second connector 42 slides along the sliding shaft 41a and then the engagement portions 411 of the first connector 41 disengages from the receiving portions 421, and the connecting rod 6 connected with the roller shutter body 2 is moved with the second connector 42. After that, the hand wheel 7 is rotated, causing the rotating shaft 5 to rotate, and then the connecting rod 6 is rotated around the central axis of the rotating shaft 5, accordingly, the roller shutter body 2 is driven to move upward along the first groove 1a and the second groove 1b of the door frame 1 and rolled up and finally received in the receiving rail 91. At this time, the roller shutter is in the open state. Similarly, when the roller shutter body 2 is manually extended, it's just required to manually reverse the rotation of the hand wheel 7, causing the roller shutter body 2 to leave the receiving rail 91 and enter to the first groove 1a and the second groove 1b, and then the roller shutter is in the closed state, as shown in FIG. 9.

Compared with the prior art, in the present invention, the roller shutter body 2 is slidably configured on the door frame 1, the driving motor 3 and the rotating shaft 5 are arranged on the door frame 1, and the output end of the driving motor 3 is connected with the rotating shaft 5 by the connecting device 4, and the rotating shaft 5 is connected with the upper end of the roller shutter body 2 through the connecting rod 6. In such configurations, by connecting the connecting device 4, the output end of the driving motor 3 can be fixedly connected with the rotating shaft 5 circumferentially, so that the connecting rod 6 can be circumferentially rotated around the central axis of the rotating shaft 5, to drive the roller shutter body 2 to automatically retract or extend, thereby automatically opening or closing the roller shutter. Furthermore, by disconnecting the connecting device 4, the output end of the driving motor 3 can be separated from the rotating shaft 5, to avoid the rotating shaft 5 to be stuck or locked by the stopped driving motor 3, so that the rotating shaft 5 may be manually driven to rotate the connecting rod 6, and the roller shutter body 2 is accordingly driven to retract or extend, thereby manually opening or closing the roller shutter. By these tokens, the roller shutter of the present invention may be automatically opened or closed during a normal power supply, and also may be opened or closed by manual operation in the absence of power supply or in case of circuit failure, which greatly improves the reliability and convenience of the roller shutter.

The above-mentioned embodiments only denote several embodiments of the present application, and the descriptions thereof are relatively specific and detailed, but should not be construed as limiting the scope of the patent application. It should be pointed out that for those skilled in the art, several modifications and improvements can be made without departing from the concept of the present application, which all belong to the protection scope of the present application. Therefore, the scope of protection of the patent of the present application shall be subject to the appended claims.

What is claimed is:

1. A roller shutter with dual operation modes, comprising a door frame, a roller shutter body, a driving motor, a connecting device, a rotating shaft and a connecting rod,
    wherein the roller shutter body is slidably configured on the door frame, and the driving motor is configured on the door frame; the rotating shaft is rotatably configured at an upper end of the door frame; the rotating shaft is connected with an output end of the driving motor through the connecting device;
    wherein the connecting device comprises a first connector and a second connector, the first connector is connected with the output end of the driving motor, the second connector is connected with the rotating shaft; the rotating shaft is movably configured on the door frame along a center axis direction, the first connector is selectively engaged or disengaged with the second connector, so that the first connector and the second connector are mutually fixed circumferentially or separated axially;
    a first end of the connecting rod is connected with the second connector so as to connect with the rotating shaft, and the first end of the connecting rod is slidable along a direction perpendicular to a central shaft of the rotating shaft, a second end of the connecting rod is connected with an upper end of the roller shutter body;
    when the connecting device is in a connected state that the first connector and the second connector are mutually fixed circumferentially, the output end of the driving motor is connected with the rotating shaft circumferentially, the driving motor is configured to drive the first connector and then drive the second connector so as to drive the connecting rod to retract or extend the roller shutter body; when the connecting device is in a separated state that the first connector and the second connector are separated axially, the output end of the driving motor is separated from the rotating shaft, the rotating shaft is manually operated to drive the second connector and then drive the connecting rod to retract or extend the roller shutter body.

2. The roller shutter with dual operation modes according to claim 1, wherein the connecting device further comprises an elastic element configured to provide an elastic force to facilitate a mutual connection between the first connector and the second connector.

3. The roller shutter with dual operation modes according to claim 1, wherein one of the first connector and the second connector is provided with a plurality of engagement portions extended around a central axis thereof, and another of the first connector and the second connector is provided with a plurality of receiving portions to receive the engagement portions.

4. The roller shutter with dual operation modes according to claim 1, wherein a center of the first connector is provided with a sliding shaft, and a center of the second connector is provided with a hole to allow the sliding shaft to slide therein.

5. The roller shutter with dual operation modes according to claim 1, wherein one end of the second connector is provided with a limiting part.

6. The roller shutter with dual operation modes according to claim 1, wherein the connecting rod is slidably connected with the upper end of the roller shutter body, and is slidable along a direction of the central shaft of the rotating shaft.

7. The roller shutter with dual operation modes according to claim 1, wherein the connecting rod is extendable.

8. The roller shutter with dual operation modes according to claim 1, wherein one end of the rotating shaft is provided with a hand wheel.

9. The roller shutter with dual operation modes according to claim 1, wherein left and right sides of the door frame are provided with a luminous element arranged along a height direction of the door frame.

10. The roller shutter with dual operation modes according to claim 9, wherein the door frame is provided with a receiving groove with an opening formed at a front side thereof, and the luminous element is configured in the receiving groove and exposed at the opening.

11. The roller shutter with dual operation modes according to claim 1, further comprising a controller and a sensor, wherein the controller is electrically connected with the sensor and the driving motor respectively, the sensor is configured on a front side of the door frame and is configured to instruct the controller to stop the driving motor when an object appears below the roller shutter body.

12. The roller shutter with dual operation modes according to claim 1, further comprising a controller which is configured as a light sensor.

13. The roller shutter with dual operation modes according to claim 12, wherein the controller is configured to instruct the driving motor according to a signal from the light sensor, and the driving motor is energized to drive the roller shutter body; when the roller shutter body moves in place and in a limiting position, an increase of a supply current of the driving motor is detected, and the controller instructs the driving motor to disconnect the supply current.

14. The roller shutter with dual operation modes according to claim 1, further comprising a controller which is configured as one of a temperature and humidity sensor, a rain sensor, an infrared sensor, a microwave sensor, a wind speed sensor, a voice control sensor and a programmable timer to control the driving motor to drive the roller shutter body.

15. The roller shutter with dual operation modes according to claim 14, further comprising an accumulator and a solar panel electrically connected with the accumulator, wherein the accumulator is configured in a box body of the controller and electrically connected with the controller and the accumulator.

16. The roller shutter with dual operation modes according to claim 1, wherein the door frame is provided with a first groove and a second groove at both sides to allow two sides of the roller shutter body to slide thereon; and a housing is further arranged on the door frame and provided with two receiving rails at both sides, and ends of the receiving rails are connected with ends of the first groove and the second groove.

17. The roller shutter with dual operation modes according to claim 16, wherein each of the receiving rails is in a planar spiral structure.

18. The roller shutter with dual operation modes according to claim 16, wherein the door frame comprises two side frames, and the side frames and the housing are provided with fixed holes.

19. The roller shutter with dual operation modes according to claim 1, wherein a lower edge of the roller shutter body is provided with a limiting rod.

* * * * *